(12) United States Patent
Huang

(10) Patent No.: US 8,827,524 B2
(45) Date of Patent: Sep. 9, 2014

(54) COMPUTER BEZEL WITH LIGHT-GUIDE STRUCTURE

(75) Inventor: Fu-Kuo Huang, New Taipei (TW)

(73) Assignee: Hon Hai Precision Industry Co., Ltd., New Taipei (TW)

(*) Notice: Subject to any disclaimer, the term of this patent is extended or adjusted under 35 U.S.C. 154(b) by 244 days.

(21) Appl. No.: 13/476,902

(22) Filed: May 21, 2012

(65) Prior Publication Data

US 2013/0070474 A1    Mar. 21, 2013

(30) Foreign Application Priority Data

Sep. 16, 2011   (TW) ................................. 100133531

(51) Int. Cl.
  *F21V 7/04* (2006.01)
(52) U.S. Cl.
  USPC .......... 362/602; 362/603; 362/607; 362/97.4; 362/633
(58) Field of Classification Search
  CPC ................... H01L 27/14625; H01L 31/02327; H01L 33/38; H01L 27/14629; H01L 2924/1815; H01L 21/2575; G02B 6/0068; G02B 6/0038; G02B 6/0055; G02B 6/0053; G02B 6/0036; G02B 6/0028; G02B 6/0018; G02B 6/0031; G02B 19/0014; G02B 6/004
  USPC .............. 362/600–634, 97.1, 97.2, 97.3, 97.4
  See application file for complete search history.

(56) References Cited

U.S. PATENT DOCUMENTS

2007/0159830 A1* 7/2007 Chen et al. ..................... 362/310
2010/0265712 A1* 10/2010 Singh et al. ..................... 362/253

* cited by examiner

*Primary Examiner* — Anh Mai
*Assistant Examiner* — Fatima Farokhrooz
(74) *Attorney, Agent, or Firm* — Novak Druce Connolly Bove + Quigg LLP

(57) ABSTRACT

A computer bezel includes a bezel body, a light-guide structure mounted to the bezel body, and one or more light sources mounted on the bezel body. The light-guide structure includes a first bottom surface and a first end surface connected to the first bottom surface. The lighting portion includes an outer surface exposed out of the bezel body, a first side surface, and a second bottom surface connected to the guiding portion. A cross section of the light-guide structure is L-shaped taken along a plane substantially parallel to the first end surface. The guiding portion is configured to guide a plurality of light beams emitted from the light source to the lighting portion to enable the plurality of light beams to be refracted from the outer surface so as to be visible to a user.

18 Claims, 5 Drawing Sheets

COMPUTER BEZEL WITH LIGHT-GUIDE STRUCTURE

BACKGROUND

1. Technical Field

The present disclosure relates to electronic devices, and more particularly to a computer bezel with a light-guide structure.

2. Description of Related Art

Indicator lamps are used in electronic devices such as computers and testing devices. The electronic device may include a panel, a circuit board, and an indicator lamp or lens secured to an outside surface of the panel. A light source is electronically connected to the circuit board. The indicator lamp and the light source may be arranged in a straight line, that is substantially perpendicular to the circuit board, and light beams from the light source can be directly transmitted to the indicator lamp. However, when the indicator lamp or lens is attached to a different location, the light beams from the light source cannot be completely or efficiently transmitted to the indicator lamp. Thus, a brightness of the indicator lamp or lens is so weak such that the indicator lamp may be nearly invisible. Therefore, an electronic device with an improved light-guide structure is desirable.

BRIEF DESCRIPTION OF THE DRAWINGS

Many aspects of the embodiments can be better understood with reference to the drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
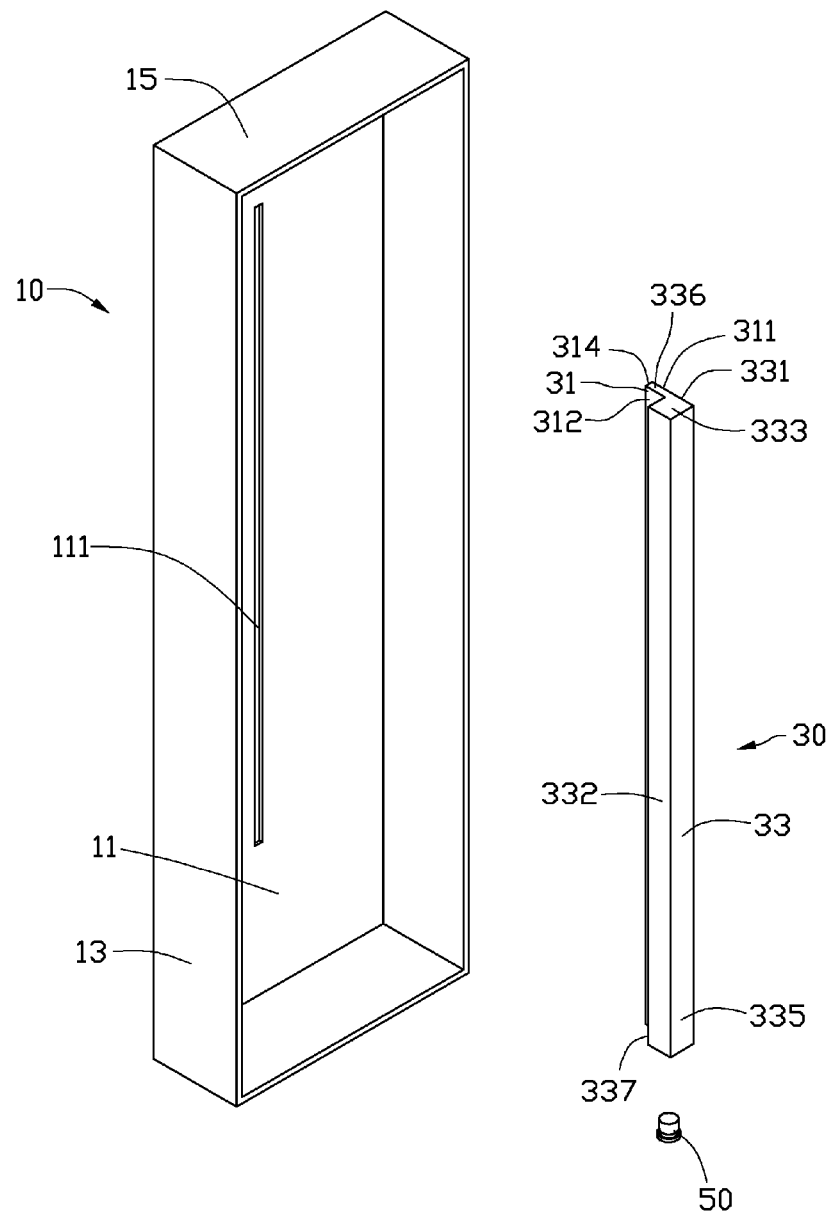
FIG. 1 is an exploded, isometric view of a computer bezel in accordance with one embodiment.

Referring to FIG. 1, a computer bezel in accordance with an exemplary embodiment includes a bezel body 10, a light-guide structure 30, and a light source 50. In one embodiment, the light source 50 is a light emitting diode (LED).

The bezel body 10 includes a front panel 11, a top panel 13 extending from the front panel 11, and two side panels 15 extending from the front pane 11. The two side panels 15 are substantially parallel to each other and substantially perpendicular to the top panel 13. The front panel 11 defines an elongated opening 111.

The light-guide structure 30 includes a lighting portion 31 and a guiding portion 33 extending from the lighting portion 31. The guiding portion 33 is rectangular. The guiding portion 33 includes a first bottom surface 331, a top surface 332 that is substantially parallel to the first bottom surface 331, two first end surfaces 333, a second end surface 335 that is substantially perpendicular to the first bottom surface 331, and a third end surface 337 that is substantially perpendicular to the first bottom surface 331. The third end surface 337 is substantially parallel to the second end surface 335. The top surface 332 is connected between the second end surface 335 and the third end surface 337. The lighting portion 31 includes a second bottom surface 311, a first side surface 312 that is substantially parallel to the second bottom surface 311, an outer surface 314 connected between the first side surface 312 and the second bottom surface 311, and two second side surfaces 316 that is substantially parallel to each other. The outer surface 314 is configured to be received in the elongated opening 111. In one embodiment, the outer surface 314 is substantially parallel to the second end surface 335. The first bottom surface 331 of the guiding portion 33 and the second bottom surface 311 of the lighting portion 31 are in the same plane. The second side surface 316 and the corresponding first end surface 333 are in the same plane. The first bottom surface 331 is substantially perpendicular to the front panel 11. The lighting portion 31 includes an end portion 315 adjacent to the first end surface 333 of the guiding portion 33. A cross section of the light-guide structure 30 is L-shaped taken along a plane that is substantially parallel to the first end surface 333.

Figure 2:
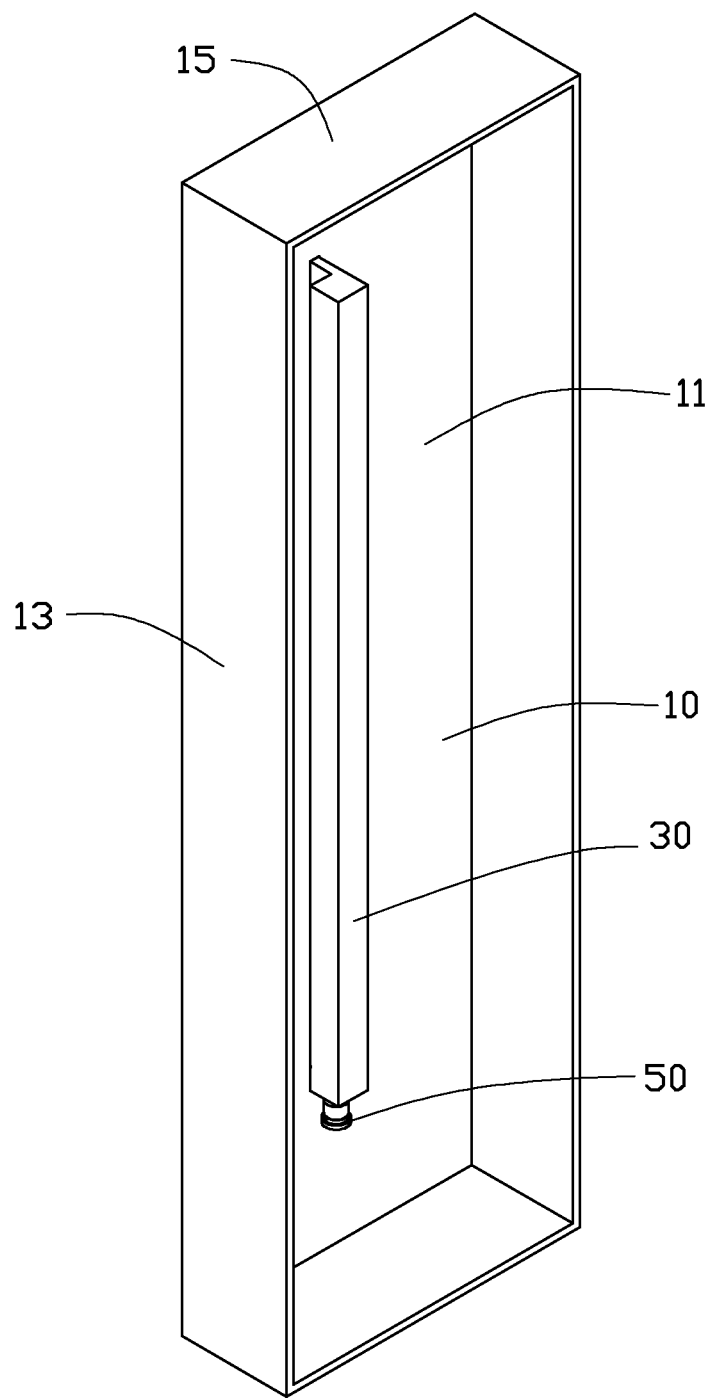
FIG. 2 is an assembled view of the computer bezel of FIG. 1.
Figure 3:
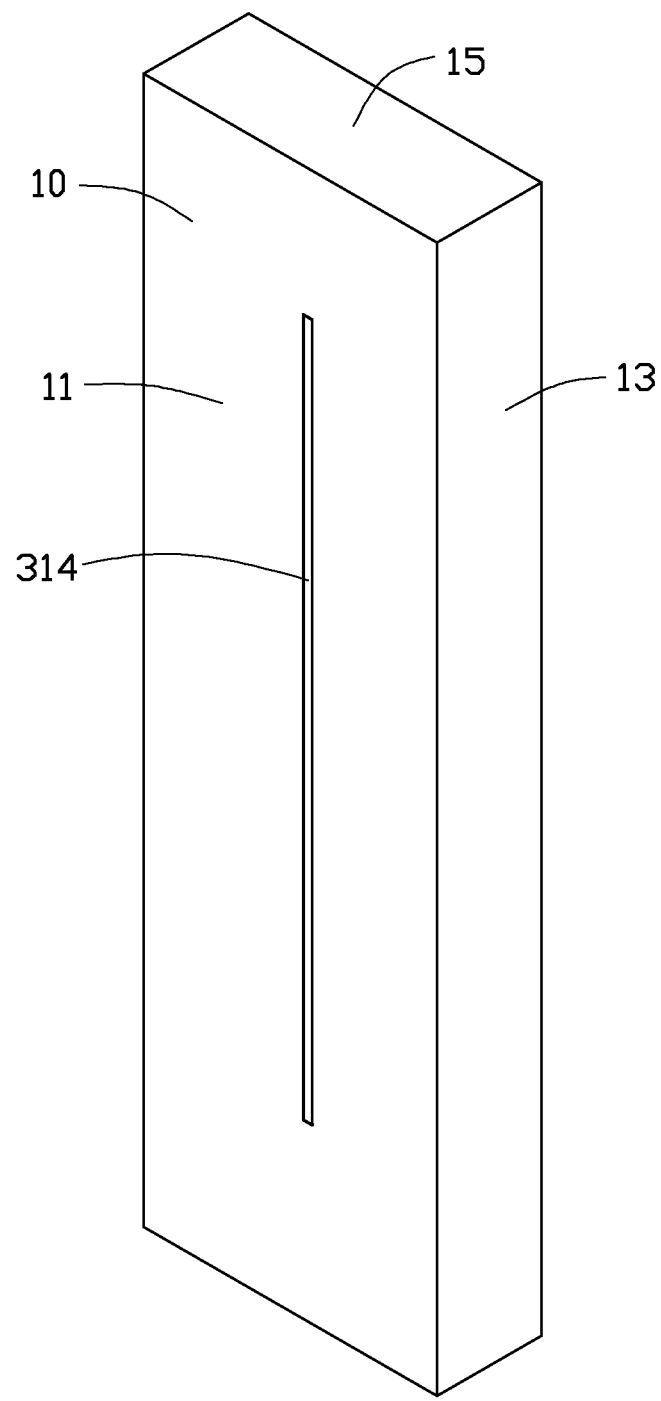
FIG. 3 is similar to FIG. 2, but viewed from another aspect.
Figure 4:
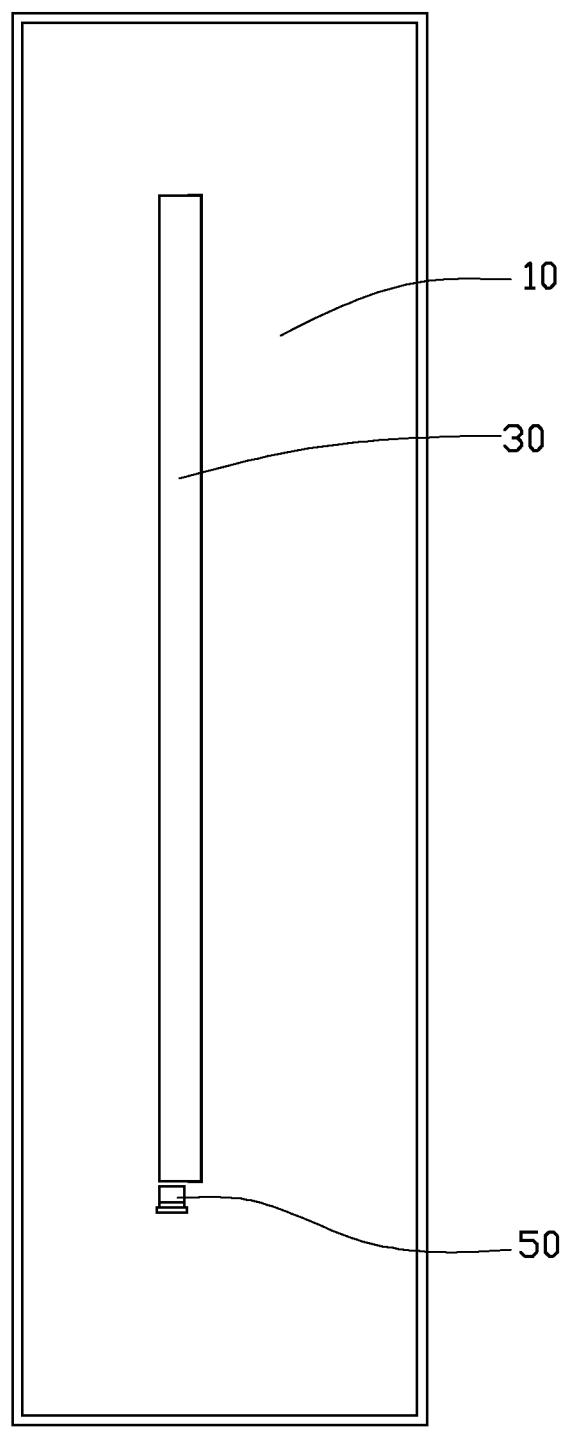
FIG. 4 is similar to FIG. 2, but viewed from another aspect.

Referring to FIGS. 2 to 4, in assembly, the lighting portion 31 of the light-guide structure 30 is received in the elongated opening 111 to enable the outer surface 314 to be exposed out of the bezel body 10. At this time, the guiding portion 33 of the light-guide structure 30 is located on the inner surface of the front panel 11. The light source 50 is mounted on the bezel body 10 and adjacent to the first end surface 333 of the guiding portion 33.

Figure 5:
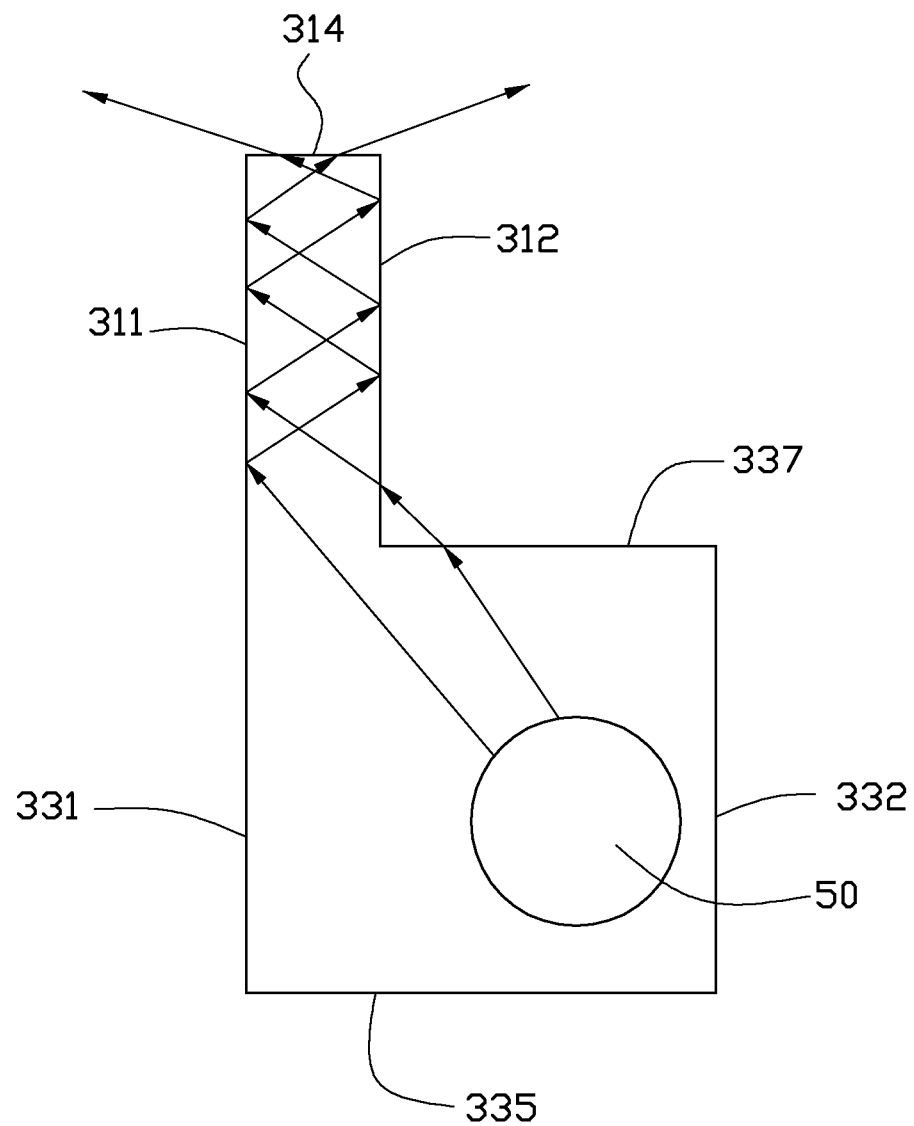
FIG. 5 is a schematic view of the light-guide structure and the light source of FIG. 1 in operation.

Referring to FIGS. 4 and 5, in use, a plurality of light beams are emitted from the light source 50 into the guiding portion 33 via the first end surface 333. The first light beams are refracted to the third end surface 337 via the first end surface 333. The second light beams are emitted into the lighting portion 31 after being refracted by the third end surface 337. Then the third light beams are refracted from the outer surface 314 so as to be visible to a user.

It is to be understood, however, that even though numerous characteristics and advantages have been set forth in the foregoing description of embodiments, together with details of the structures and functions of the embodiments, the disclosure is illustrative only and changes may be made in detail, especially in the matters of shape, size, and arrangement of parts within the principles of the disclosure to the full extent indicated by the broad general meaning of the terms in which the appended claims are expressed.

What is claimed is:

1. A computer bezel comprising:
    a bezel body;
    a light-guide structure, mounted to the bezel body, comprising a guiding portion and a lighting portion extending from the guiding portion; the guiding portion comprises a first bottom surface, and a first end surface connected to the first bottom surface; the lighting portion comprises an outer surface exposed out of the bezel body, a first side surface, and a second bottom surface connected to the guiding portion; the outer surface connected to the first side surface and the second bottom surface; and a cross section of the light-guide structure being L-shaped taken along a first plane substantially parallel to the first end surface; and
    a light source, mounted on the bezel body, is adjacent to the first end surface;

wherein the guiding portion is configured to guide a plurality of light beams emitted from the light source to the lighting portion to enable the plurality of light beams to be refracted from the outer surface.

2. The computer bezel of claim 1, wherein the second bottom surface and the first bottom surface are in a second plane.

3. The computer bezel of claim 2, wherein the first side surface is substantially parallel to the second bottom surface.

4. The computer bezel of claim 3, wherein the lighting portion further comprises a second side surface connected to the first end surface; and the second side surface and the first end surface are in a third plane.

5. The computer bezel of claim 1, wherein the outer surface is substantially perpendicular to the second bottom surface.

6. The computer bezel of claim 1, wherein the guiding portion further comprises a top surface substantially parallel to the first bottom surface and a second end surface connected to the first bottom surface and the top surface.

7. The computer bezel of claim 6, wherein the second end surface is substantially perpendicular to the first bottom surface.

8. The computer bezel of claim 6, wherein the guiding portion further comprises a third end surface connected to the top surface and the first side surface.

9. The computer bezel of claim 8, wherein the third end surface is substantially parallel to the second end surface.

10. A computer bezel comprising:
a bezel body, the bezel body comprising a front panel, the front panel defines an elongated opening;
a light-guide structure, mounted to the bezel body, comprising a guiding portion and a lighting portion extending from the guiding portion; the lighting portion defines an outer surface; the lighting portion received in the elongated opening to enable the outer surface to be exposed out of the bezel body and enable the guiding portion to be located on an inner surface of the bezel body; the guiding portion comprising a first bottom surface and a first end surface connected to the first bottom surface; the first bottom surface substantially perpendicular to the front panel; the lighting portion comprising a first side surface and a second bottom surface connected to the guiding portion; the outer surface connected to the first side surface and the second bottom surface; and a cross section of the light-guide structure being L-shaped taken along a first plane substantially parallel to the first end surface; and
a light source, mounted on the bezel body, adjacent to the first end surface;
wherein the guiding portion is configured to guide a plurality of light beams emitted from the light source to the lighting portion to enable the plurality of light beams to be refracted from the outer surface.

11. The computer bezel of claim 10, wherein the second bottom surface and the first bottom surface are in a second plane.

12. The computer bezel of claim 11, wherein the first side surface is substantially parallel to the second bottom surface.

13. The computer bezel of claim 12, wherein the lighting portion further comprises a second side surface connected to the first end surface; and the second side surface and the first end surface are in a third plane.

14. The computer bezel of claim 10, wherein the outer surface is substantially perpendicular to the second bottom surface.

15. The computer bezel of claim 10, wherein the guiding portion further comprises a top surface substantially parallel to the first bottom surface and a second end surface connected to the first bottom surface and the top surface.

16. The computer bezel of claim 15, wherein the second end surface is substantially perpendicular to the first bottom surface.

17. The computer bezel of claim 15, wherein the guiding portion further comprises a third end surface connected to the top surface and the first side surface.

18. The computer bezel of claim 17, wherein the third end surface is substantially parallel to the second end surface.

* * * * *